(12) United States Patent
Cheon et al.

(10) Patent No.: US 11,201,735 B2
(45) Date of Patent: Dec. 14, 2021

(54) APPARATUS FOR PERFORMING THRESHOLD DESIGN ON SECRET KEY AND METHOD THEREOF

(71) Applicants: Crypto Lab Inc., Seoul (KR); Seoul National University R&DB Foundation, Seoul (KR)

(72) Inventors: Jung Hee Cheon, Seoul (KR); Jinhyuck Jeong, Seoul (KR); Donggeon Yhee, Jeongeup-si (KR); Wonhee Cho, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/791,297

(22) Filed: Feb. 14, 2020

(65) Prior Publication Data

US 2020/0266974 A1  Aug. 20, 2020

Related U.S. Application Data

(60) Provisional application No. 62/806,430, filed on Feb. 15, 2019.

(30) Foreign Application Priority Data

Nov. 12, 2019  (KR) .................. 10-2019-0144484

(51) Int. Cl.
  *H04L 9/08*  (2006.01)
  *H04L 9/06*  (2006.01)
(52) U.S. Cl.
  CPC ............ *H04L 9/085* (2013.01); *H04L 9/0618* (2013.01); *H04L 9/0819* (2013.01); *H04L 9/0869* (2013.01)

(58) Field of Classification Search
  USPC .......... 380/28, 255, 264, 276; 726/2, 21, 36; 713/150, 163, 181
  See application file for complete search history.

(56) References Cited

U.S. PATENT DOCUMENTS

| | | | |
|---|---|---|---|
| 7,773,746 B2 | 8/2010 | Futa et al. | |
| 7,885,215 B2* | 2/2011 | Pecen ................ | H04B 7/2621 370/310 |
| 10,187,326 B1* | 1/2019 | Anand ................ | H04L 43/08 |

(Continued)

FOREIGN PATENT DOCUMENTS

| | | |
|---|---|---|
| JP | 2009033608 A | 2/2009 |
| KR | 20070011293 A | 1/2007 |

(Continued)

OTHER PUBLICATIONS

Office Action issued in the counterpart Korean Patent Application No. 10-2019-0144484, dated May 1, 2020 (11 pages).

(Continued)

*Primary Examiner* — Sharif E Ullah
(74) *Attorney, Agent, or Firm* — Osha Bergman Watanabe & Burton LLP

(57) ABSTRACT

An encryption method is disclosed. The encryption method includes calculating a secret key from a ring as a set closed for addition and multiplication defined between elements, generating a plurality of partial secret keys using the calculated secret key and a random matrix, and distributing the plurality of generated partial secret keys.

9 Claims, 5 Drawing Sheets

(56) References Cited

U.S. PATENT DOCUMENTS

| | | | | |
|---|---|---|---|---|
| 2007/0274518 A1* | 11/2007 | Futa | | H04L 9/3093 |
| | | | | 380/30 |
| 2010/0020964 A1* | 1/2010 | Horie | | G06F 7/725 |
| | | | | 380/44 |
| 2012/0114120 A1* | 5/2012 | Kambayashi | | H04L 9/0844 |
| | | | | 380/44 |
| 2016/0119119 A1* | 4/2016 | Calapodescu | | G06F 21/6227 |
| | | | | 380/30 |
| 2017/0053132 A1* | 2/2017 | Resch | | G06F 12/1408 |
| 2018/0309574 A1* | 10/2018 | Lyubashevsky | | H04L 9/3093 |
| 2019/0222597 A1* | 7/2019 | Crabtree | | H04L 63/1425 |
| 2020/0394708 A1* | 12/2020 | Celia | | G06Q 40/025 |
| 2021/0226928 A1* | 7/2021 | Crabtree | | G06F 16/951 |
| 2021/0258305 A1* | 8/2021 | Crabtree | | H04L 63/1433 |

FOREIGN PATENT DOCUMENTS

| | | |
|---|---|---|
| KR | 100680231 B1 | 2/2007 |
| KR | 2014-0072188 A | 6/2014 |
| KR | 102022333 B1 | 11/2019 |
| KR | 102040106 B1 | 11/2019 |

OTHER PUBLICATIONS

International Search Report issued for PCT/KR2020/001687, dated May 19, 2020 (3 pages).

Written Opinion issued for PCT/KR2020/001687, dated May 19, 2020 (6 pages).

Stanislaw Spiez et al. Secret Sharing Matrices, Institute of Mathematics of the Polish Academy of Sciences, Sep. 9, 2009 (25 pages).

Shamir's Secret Sharing—A numeric example walkthrough, dated Sep. 23, 2018 (6 pages).

Notice of Preliminary Rejection issued in corresponding Korean Patent Application No. 10-2020-0121754 dated Mar. 21, 2021 (7 pages).

Notice of Preliminary Rejection issued in corresponding Korean Patent Application No. 10-2020-0121754 dated Mar. 31, 2021 (7 pages).

Office Action issued in counterpart Korean Patent Application No. 10-2020-0121754 dated Oct. 24, 2021 (7 pages).

\* cited by examiner

APPARATUS FOR PERFORMING THRESHOLD DESIGN ON SECRET KEY AND METHOD THEREOF

CROSS-REFERENCE TO RELATED APPLICATIONS

This application is based on and claims priority under 35 U.S.C. 119 to Korean Patent Application No. 10-2019-0144484, filed on Nov. 12, 2019, in the Korean Intellectual Property Office, which claims the benefit of U.S. Provisional Patent Application No. 62/806,430, filed on Feb. 15, 2019, in the U.S. Patent and Trademark Office, the disclosures of which are herein incorporated by reference in their entireties.

BACKGROUND

Field

Apparatuses and methods consistent with the disclosure relate to an apparatus for performing threshold design on a secret key and a method thereof, and more particularly, to an apparatus for performing a threshold design on a secret key for an approximate cipher text and distributing the secret key, and a method thereof.

Description of the Related Art

As communication technologies have been developed and electronic devices have become actively prevalent, efforts have continuously been made to maintain communication security between electronic devices. Therefore, encryption/decryption technologies have been used in most communication environments.

Meanwhile, cipher text may be decrypted using secret keys, and recently, a threshold design (or a quorum design) is performed on the secret keys. Here, the threshold design is designed to distribute secret keys to everyone and to decrypt the cipher text only when a certain number of people gather.

In the related art, a Shamir secret key distribution scheme or {0, 1}-linear secret sharing scheme (LSSS) has been used for the threshold design, but the related art scheme has a very large linear combination coefficient for recovering the secret keys, causing problems that a prime number q for decryption must satisfy certain conditions, and thus there are restrictions on q or the number of secret keys to be distributed to each person is very large.

In other words, a magnitude of prime numbers or the number of secret keys is restricted depending on a total number of people.

SUMMARY OF THE INVENTION

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides an apparatus for performing threshold design on secret keys for an approximate cipher text and distributing the secret keys, and a method thereof.

According to an embodiment of the disclosure, an encryption method includes: calculating a secret key from a ring as a set closed for addition and multiplication defined between elements; generating a plurality of partial secret keys using the calculated secret key and a random matrix; and distributing the plurality of generated partial secret keys.

The random matrix may have a number of rows corresponding to a number of users and a number of columns corresponding to a threshold.

The random matrix may have a number of rows corresponding to a number of users and a number of secret keys to be distributed to each user and a number of columns corresponding to a threshold.

In the distributing, the plurality of distribution secret keys may be distributed to each user.

In the generating, a plurality of random values may be generated and the plurality of partial secret keys may be generated by applying a vector matrix including the plurality of random values and the secret key to the random matrix.

The encryption method may further include: generating a public key using the secret key; and generating a cipher text using the generated public key.

The encryption method may further include: collecting partial decipher texts each generated by applying the cipher text to a partial secret key equal to or greater than a threshold; and decrypting a plaintext for the cipher text using the partial decipher texts equal to or greater than the threshold.

The encryption method may further include: collecting partial secret keys equal to or greater than a threshold, among the plurality of partial secret keys; and recovering the secret key using the collected partial secret keys.

According to another embodiment of the disclosure, an arithmetic operation device includes: a memory configured to store at least one instruction; and a processor configured to execute the at least one instruction, wherein the processor is configure to, by executing the at least one instruction, calculate a secret key from a ring as a set closed for addition and multiplication defined between elements, generate a plurality of partial secret keys using the calculated secret key and a random matrix, and distribute the plurality of generated partial secret keys.

The processor may be configured to generate a plurality of random values and generate the plurality of partial secret keys by applying a vector matrix including the plurality of random values and the secret key to the random matrix.

The random matrix may have a number of rows corresponding to a number of users and a number of secret keys to be distributed for each user and a number of columns corresponding to a threshold, and the processor may be configured to distribute the plurality of partial secret keys to each user.

The processor may be configured to generate a public key using the secret key and generate a cipher text using the generated public key.

The processor may be configured to collect partial decipher texts each generated by applying the cipher text to a partial secret key equal to or greater than a threshold and decrypt a plain text for the cipher text using the partial decipher texts equal to or greater than the threshold.

According to diverse embodiments of the disclosure as described above, when the threshold is satisfied using a random matrix, a secret key is distributed to enable decryption, thereby further reducing a magnitude of the linear combination coefficient.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the disclosure will be more apparent by describing certain embodiments of the disclosure with reference to the accompanying drawings, in which.

DETAILED DESCRIPTION OF THE EMBODIMENTS

Hereinafter, the disclosure will be described in detail with reference to the accompanying drawings. Encryption/decryption may be applied to an information (data) transmission process performed in the disclosure, and expressions for describing the information (data) transmission process in the disclosure and claims should all be construed to include the case of encrypting/decrypting although not mentioned separately. Expression in the form of "transmission (transfer) from A to B" or "reception by A from B" includes transmission (transfer) or reception by an intermediate medium and does not necessarily limited to only directly transmission (transfer) or reception from A to B.

In the description of the disclosure, the order of each step should be understood nonrestrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non-exclusive sense to include any other component.

In this specification, the term "value" is defined as a concept including not only a scalar value but also a vector.

The mathematical operation and calculation of each step of the disclosure described hereinafter may be realized by a computer operation by a coding method known for corresponding operation or calculation and/or coding devised suitably for the disclosure.

Specific formulas described hereinafter are exemplarily described among various possible alternatives, and the scope of the disclosure should not be construed as being limited to the formulas mentioned in the disclosure.

For convenience of description, the following is assumed.

a←D: element (a) is selected according to distribution (D)

$s_1, s_2 \in R$: S1 and S2 are each an element belonging to R set.

mod (q): Modular operation with q elements $\iota^{-1}$ : Internal value is round off Hereinafter, various embodiments of the disclosure will be described in detail with reference to the accompanying drawings.

Figure 1:
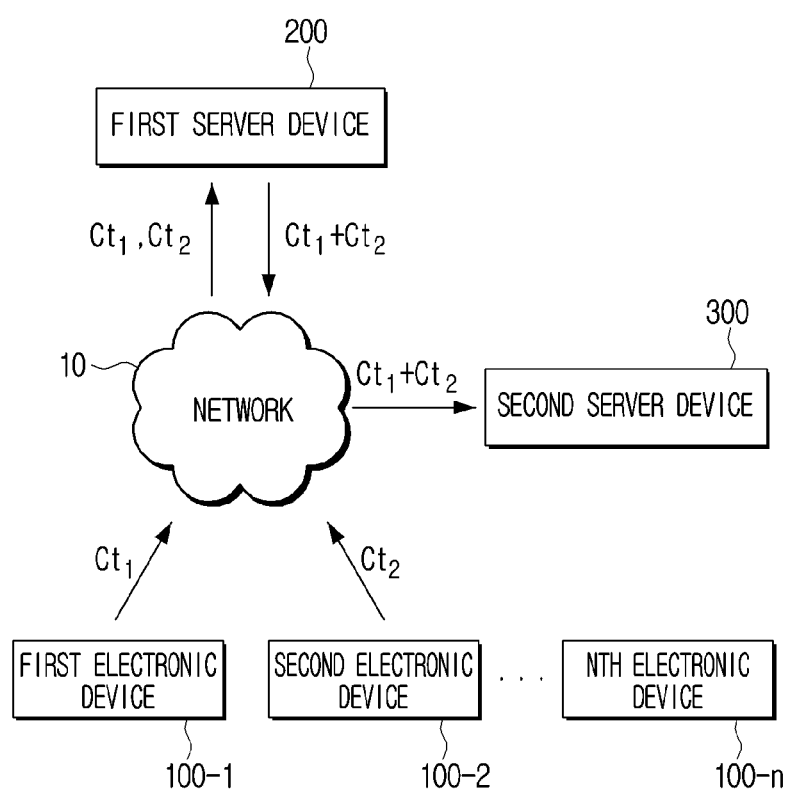
FIG. 1 is a view illustrating a structure of a network system according to an embodiment of the disclosure.

FIG. 1 is a view illustrating a configuration of a network system according to an embodiment of the disclosure.

Referring to FIG. 1, a network system may include a plurality of electronic devices 100-1 to 100-*n*, a first server device 200, and a second server device 300, and these components may be connected to each other via a network 10.

The network 10 may be implemented in various types of wired/wireless communication networks, broadcast communication networks, optical communication networks, cloud networks, and the like, and each device may also be connected by a method such as Wi-Fi, Bluetooth, and near field communication (NFC), and the like, without a separate medium.

In FIG. 1, a plurality of electronic devices 100-1 to 100-*n* are illustrated but the plurality of electronic devices may not necessarily be used and one device may be used. For example, the electronic devices 100-1 to 100-*n* may be implemented in various types of devices such as smartphones, tablets, game players, PCs, laptop PCs, home servers, secret kiosks, and the like, and may also be implemented in the form of a home appliance to which an IoT function is applied.

A user may input various information through the electronic devices 100-1 to 100-*n* used by the user. The input information may be stored in the electronic devices 100-1 to 100-*n* but may be transmitted to and stored in an external device for the reason of storage capacity and security. In FIG. 1, the first server device 200 may serve to store such information, and the second server device 300 may serve to use some or all of the information stored in the first server device 200.

Each of the electronic devices 100-1 to 100-*n* may homomorphically encrypt the input information and transmit the homomorphic cipher text to the first server device 200. For example, each of the electronic devices 100-1 to 100-*n* may homomorphically encrypt the input information using a public key and transmit a homomorphic cipher text to the first server device 200.

In this case, each of the electronic devices 100-1 to 100-*n* may include encryption noise, i.e., an error, calculated in the process of performing the homomorphic encryption, in the cipher text. Accordingly, the homomorphic cipher text generated by each of the electronic devices 100-1 to 100-*n* may be generated in a form in which a resultant value including a message and an error value is restored when decrypted later using a secret key.

For example, the homomorphic cipher text generated by the electronic devices 100-1 to 100-*n* may be generated in a form satisfying the following properties when decrypted using a secret key.

$$Dec(ct,sk) = <ct,sk> = M + e \pmod{q} \quad \text{[Equation 1]}$$

Here, <, > are usual inner products, ct is cipher text, sk is secret key, M is plaintext message, e is an encryption error value, and mod q is Modulus of cipher text. q should be chosen to be greater than a resultant value M obtained by multiplying the message by a scaling factor Δ. If an absolute value of the error value e is smaller enough than M, then a decrypted value M+e of the cipher text is a value that may replace an original message with the same precision in significant digit arithmetic operation. Among the decrypted data, an error may be disposed on the least significant bit s (LSB) side and M may be disposed on a second LSB side.

If a size of the message is too small or too large, the size of the message may be adjusted using a scaling factor. When the scaling factor is used, even a message in the form of a real number, as well as the form of an integer, may be encrypted, utilization may be significantly increased. In addition, by adjusting the size of the message using the scaling factor, a size of an area in which the messages exist, that is, an effective area, in the cipher text after the arithmetic operation is performed may also be adjusted.

According to an embodiment, the cipher text modulus q may be set and used in various forms. For example, the modulus of the cipher text may be set in the form of an exponential power $q=\Delta^L$ of the scaling factor Δ. If Δ is 2, q may be set to a value such as $q=2^{10}$.

The first server device 200 may store the received homomorphic cipher text in the cipher text form, without decrypting the received homomorphic cipher text.

The first server device 200 may generate a secret key and a public key for encryption and provide the generated public key to the plurality of electronic devices 100-1 to 100-n. Here, the first server device 200 may generate a plurality of partial secret keys for the secret key and provide the plurality of generated partial secret keys to the plurality of devices for stability.

For example, the first server device 200 may generate a plurality of partial secret keys having a threshold for the secret key described above. The first server device 200 may distribute the generated partial secret keys to the plurality of electronic devices 100-1 to 100-n. When the partial secret keys are used as described above, each of the plurality of electronic devices 100-1 to 100-n cannot perform decryption on the cipher text using only the partial secret keys of its own, and may perform decryption only when partial secret keys equal to or greater than a designed threshold gather (or only when the partial decipher texts equal to or greater than the threshold gather).

The second server device 300 may request a specific processing result for the homomorphic cipher text from the first server device 200. The first server device 200 may perform a specific arithmetic operation according to a request from the second server device 300, and then transmit a result to the second server device 300. As described above, the first server device 200 may be referred to as an arithmetic operation device in that it may perform an arithmetic operation.

For example, when the cipher texts ct1 and ct2 transmitted from the two electronic devices 100-1 and 100-2 are stored in the first server device 200, the second server device 300 may request the sum of the information provided from the electronic devices 100-1 and 100-2, from the first server device 200. The first server device 200 may perform an arithmetic operation of summing the two cipher texts according to the request, and then transmit a resultant value ct1+ct2 to the second server device 300.

In terms of the nature of the homomorphic cipher text, the first server device 200 may perform an arithmetic operation without decryption, and the resultant value is also in the cipher text form. In the disclosure, the resultant value obtained by the arithmetic operation is referred to as an arithmetic operation result cipher text.

The second server device 300 may decrypt the received arithmetic operation result cipher text to obtain an arithmetic operation resultant value of data included in each homomorphic cipher text. Here, if the second server device 300 has a secret key, the second server 300 may immediately decrypt the received arithmetic operation result cipher text. However, if the second server device 300 has a partial secret key, the second server device 300 may perform decryption after restoring the secret key by collecting other partial secret keys equal to or greater than the threshold from other devices. Alternatively, the second server device 300 may collect partial decipher texts which is a decryption result using the partial secret key for the arithmetic operation result and may perform decryption using the partial decipher texts when the collected partial decipher texts are equal to or greater than the threshold. As described above, the second server device 300 may also be referred to as an arithmetic operation device in that it performs an arithmetic operation such as decryption on the cipher text.

Meanwhile, although FIG. 1 illustrates a case that the first electronic device and the second electronic device perform encryption and the second server device performs decryption, the disclosure is not limited thereto.

Figure 2:
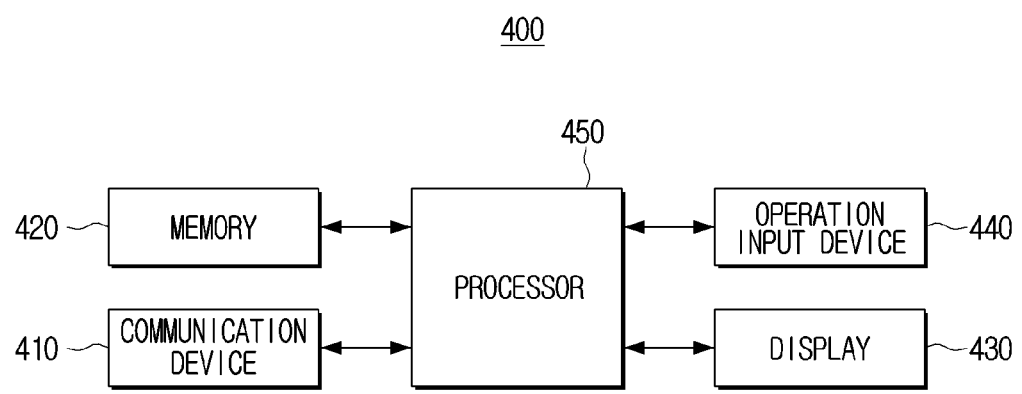
FIG. 2 is a block diagram illustrating a configuration of an arithmetic operation device according to an embodiment of the disclosure.

FIG. 2 is a block diagram illustrating a configuration of an arithmetic operation device according to an embodiment of the disclosure.

In detail, in the system of FIG. 1, the devices that perform homomorphic encryption, such as the first electronic device and the second electronic device, the device that arithmetically operates the homomorphic cipher text, such as the first server device or the like, the device that decrypts the homomorphic cipher text, such as the second server device, and the like may be referred to as arithmetic operation devices. The arithmetic operation devices may include various devices such as a personal computer, a notebook computer, a smartphone, a tablet, a server, and the like.

Referring to FIG. 2, the arithmetic operation device 400 may include a communication device 410, a memory 420, a display 430, an operation input device 440, and a processor 450.

The communication device 410 is provided to connect the arithmetic operation device 400 to an external device (not shown), and here, the communication device 410 may be connected to an external device via a local area network (LAN) and the internet or may be connected to the external device through a universal serial bus (USB) port or a wireless communication (e.g., Wi-Fi 802.11a/b/g/n, NFC, Bluetooth) port. The communication device 410 may also be referred to as a transceiver.

The communication device 410 may receive a public key from an external device and transmit a public key generated by the arithmetic operation device 400 itself to the external device.

In addition, the communication device 410 may transmit a secret key or a partial secret key generated by the arithmetic operation device 400 itself to an external device. Alternatively, the communication device 410 may receive a partial secret key from an external device.

The communication device 410 may receive a message from an external device and transmit a generated homomorphic cipher text to the external device. The communication device 410 may receive a partial decipher text decrypted with a partial secret key from the external device or transmit a partial decipher text decrypted with the partial secret key stored by the arithmetic operation device 400 to the external device.

In addition, the communication device 410 may receive various parameters necessary for generating a cipher text from an external device. Meanwhile, in the implementation, various parameters may be directly input from the user through the operation input device 440 to be described later.

In addition, the communication device 410 may receive a request for an arithmetic operation on the homomorphic cipher text from the external device and transmit a calculated result to the external device.

At least one instruction regarding the arithmetic operation device 400 may be stored in the memory 420. In detail, various programs (or software) for the arithmetic operation device 400 to operate may be stored in the memory 420 according to various embodiments of the disclosure.

The memory 420 may be implemented in various forms such as a random access memory (RAM), a read-only memory (ROM), a flash memory, a hard disk drive (HDD), an external memory, a memory card, and the like, but is not limited thereto.

The memory 420 may store a message to be encrypted. Here, the message may be various credit information, personal information, and the like quoted by the user or may be information related to a usage history such as location information and Internet usage time information used in the arithmetic operation device 400.

The memory 420 may store a public key. If the arithmetic operation device 400 is a device that directly generates a public key, the memory 420 may store various parameters necessary for generating a public key and a secret key, as well as the secret key.

In addition, if the arithmetic operation device 400 directly performs a threshold design, the memory 420 may store a plurality of partial secret keys for a secret key and store a partial secret key received from an external device. Meanwhile, according to an embodiment, one arithmetic operation device 400 may store a predetermined number of partial secret keys.

In addition, the memory 420 may store a homomorphic cipher text generated in a process to be described later. The memory 420 may store a homomorphic cipher text transmitted from an external device. In addition, the memory 420 may store an arithmetic operation result cipher text which is a result of the arithmetic operation as described later.

The memory 420 may store a partial decipher text decrypted using the partial secret key or store a partial decipher text received from an external device.

The display 430 displays a user interface window for selecting a function supported by the arithmetic operation device 400. Specifically, the display 430 may display a user interface window for selecting various functions provided by the arithmetic operation device 400. The display 430 may be a monitor such as a liquid crystal display (LCD), an organic light emitting diode (OLED), or the like or may be implemented as a touch screen capable of simultaneously performing a function of the operation input device 440 to be described later.

The display 430 may display a message requesting input of a parameter required for generating a secret key and a public key. In addition, the display 430 may display a message requesting input of a parameter required for threshold design. Here, the parameter required for the threshold design may be the number of users who are to be provided with the partial secret key, the number of partial secret keys to be provided to each user, and the threshold (i.e., a predetermined number of decryptable partial secret keys).

In addition, the display 430 may display a message in which an encryption target selects a message. Meanwhile, when implemented, the encryption target may be directly selected by the user or may be automatically selected. That is, personal information requiring encryption may be automatically set even if the user does not directly select a message.

The operation input device 440 may receive selection of a function of the arithmetic operation device 400 and a control command for the corresponding function from the user. Specifically, the operation input device 440 may receive a parameter required for generating a secret key and a public key from the user. In addition, the operation input device 440 may receive a parameter for threshold design from the user. In addition, the operation input device 440 may receive a message to be encrypted from the user.

The processor 450 controls an overall operation of the arithmetic operation device 400. Specifically, the processor 450 may control the overall operation of the arithmetic operation device 400 by executing at least one instruction stored in the memory 420. The processor 450 may be configured as a single device such as a central processing unit (CPU) or an application-specific integrated circuit (ASIC) or may include a plurality of devices such as the CPU and a graphics processing unit (GPU).

When a message to be transmitted is input, the processor 450 may store the message in the memory 420. The processor 450 may homomorphically encrypt the message using various set values and programs stored in the memory 420. In this case, the public key may be used.

The processor 450 may generate a public key required for performing encryption by itself and use the public key or may receive the public key from an external device and use the same. For example, the second server device 300 that performs decryption may distribute the public key to other devices.

When generating a secret key by itself, the processor 450 may generate the public key using a Ring-LWE technique. Specifically, the processor 450 may first set various parameters and rings and store the set parameters and rings in the memory 420. Examples of parameters may include a length of bits of a plain text, sizes of the public key and the secret key, and the like.

The ring may be expressed by the following equation.

$$R = \mathbb{Z}_q[x]/(f(x)) \qquad \text{[Equation ]}$$

Here R denotes a ring, Zq denotes a coefficient, and f(x) is an nth order polynomial.

The ring, as a set of polynomials with predetermined coefficients, refers to set in which addition and multiplication are defined between elements and which is closed for addition and multiplication. Such a ring may be referred to as a ring.

As an example, the ring refers to a set of n-th polynomials whose coefficient is Zq. Specifically, the ring refers to N-th cyclotomic polynomial when n is Φ(N). (f(x)) denotes an ideal of Zq[x] produced by (x). The Euler's totient function Φ(N) refers to the number of natural numbers which are relatively prime with N and smaller than N. If ΦN(x) is defined as the N-th cyclotomic polynomial, the ring may also be expressed as Equation 3 below.

$$R = \mathbb{Z}_q[x]/(\Phi_N(x)) \qquad \text{[Equation 3]}$$

Meanwhile, the ring of Equation 3 described above has a complex number in a plain text space. Meanwhile, in order to improve an arithmetic operation speed for the homomorphic cipher text, only a set in which the plain text space is a real number, in the set of the ring described above, may also be used.

When such a ring is established, the processor 450 may calculate a secret key sk from the ring.

$$sk \leftarrow (1, s(x)), s(x) \in R \qquad \text{[Equation 4]}$$

Here, s(x) denotes a polynomial generated randomly with a small coefficient.

The processor 450 calculates a first random polynomial a(x) from the ring. The first random polynomial may be expressed as follows.

$$a(x) \leftarrow R \qquad \text{[Equation 5]}$$

In addition, the processor 450 may calculate an error. Specifically, the processor 450 may extract an error from a discrete Gaussian distribution or a distribution having a statistical distance close thereto. This error may be expressed as follows.

$$e(x) \leftarrow D_{\alpha q}^{n} \qquad \text{[Equation 6]}$$

When the error is calculated, the processor 450 may calculate a second random polynomial by performing a modular operation on the first random polynomial and the secret key error. The second random polynomial may be expressed as follows.

$$b(x) = -a(x)s(x) + e(x) \pmod{q} \qquad \text{[Equation 7]}$$

Finally, the public key pk is set in a form including the first random polynomial and the second random polynomial as follows.

$$pk = (b(x), a(x)) \qquad \text{[Equation 8]}$$

The method of generating the secret key described above is merely an example, and thus the disclosure is not limited there and the public key and the secret key may be generated in other ways.

Meanwhile, in case of only one secret key, leakage of the secret key may cause a big security problem. Therefore, there is a need to improve security by allowing a plurality of users or a plurality of devices, instead of one user (or one device), to store the secret key separately.

In case of using the public key encryption (PKE)-based learning with error (LWE) as described above, the cipher text (c) is a vector in $\mathbb{Z}_q^{m+1}$ and the secret key (sk) is also a vector in $\mathbb{Z}_q^m$ having a decoding structure $$\langle c, sk \rangle = m \cdot \left\lfloor \frac{q}{2} \right\rfloor + e^*.$$

If <c, sk> is small enough, a decryption output value may be 0, otherwise it may have a value of 1.

Meanwhile, if a set of participants is assumed to be P=(P 1, . . . , $P_N$) and a linear secret key sharing scheme is applied to the secret key (sk), then secret keys $sk_1, \ldots, sk_N$ may be distributed to N people. For convenience of description, hereinafter, the secret keys $sk_1, \ldots, sk_N$ generated according to the application of the linear secret key sharing scheme will be referred to as partial secret keys.

In this case, when a combiner calculates recovery coefficients $\lambda = (\lambda_i)_{i \in I}$, a subset $I \subset |N|$ greater than t is expressed by Equation 9 below. Here, t is a threshold.

$$\langle c, sk \rangle = \left\langle c, \sum_{i \in I} \lambda_i sk_i \right\rangle = \sum_{i \in I} \lambda_i \cdot \langle c, sk_i \rangle \qquad \text{[Equation 9]}$$

Accordingly, each user may perform partial decryption ($p_i = \langle c, sk_i \rangle + e_i$) with an error.

Therefore, the sum of the decryption result using the partial secret key may be expressed as in Equation 10 below.

$$\sum_{i \in I} \lambda_i p_i = \langle c, sk \rangle + \sum_{i \in I} \lambda_i e_i \qquad \text{[Equation 10]}$$
$$= m \cdot \left\lfloor \frac{q}{2} \right\rfloor + e^* + \sum_{i \in I} \lambda_i e_i$$

Therefore, referring to Equation 10, if the error $[e^* + \Sigma_{i \in I} \lambda_i e_i]_q$ is designed to be small enough, it is possible to distribute and use the secret key to have a threshold.

Meanwhile, in the related art, the Shamir secret key distribution scheme and the {0,1}-LSSS scheme are used for the threshold design described above. However, the Shamir secret key distribution scheme has a problem that the linear combination coefficient λ for recovering the secret key s is very large due to LaGrange Interpolation, so that the prime q must be greater than (N!)^3, which is, thus, severely restricted. In addition, the {0,1}-LSSS scheme has a disadvantage in that the number of secret keys to be distributed is $O(N^{4.2})$ which is very large.

Accordingly, the disclosure uses a new secret key sharing method that may reduce both the magnitude of the prime and the number of secret keys. Specifically, two costs must be low enough to design a threshold for LWE. The proposed method is to grow a gray area such that the number of partial secret keys collected from t participants is greater than or equal to a predetermined value (i.e., the threshold) required for recovering the secret key.

Accordingly, the disclosure proposes a so-called "subset secret key method" that provides a basic configuration of the LSSS having a small recovery coefficient using an inhomogeneous small integer solution (ISIS) issue and generalizes the basic configuration.

If it is assumed that a set of secret keys Si is distributed to each user Pi to satisfy t out of N, $n_i$ is the number of secret sharers collected from a certain i subset of $\{S_1, \ldots, S_N\}$ and $\Delta n_i$ is $n_i - n_{i-1}$, for i=1, . . . , N.

Also when $$t = n_{i-1} + 1$$

is set, t tout of N LSSS is configured in a shared matrix $U \in \mathbb{Z}_q^{nN \times i}$, and $I \subset \{1, \ldots, N\}$ with $|I| = t_i$ is considered, a main purpose to find $\lambda \in \mathbb{Z}_q^{n_i}$ such as $\|\lambda\|_2 \leq B$, $\lambda \cdot U_I = (1, 0, \ldots, 0)$.

Here, $U_I$ is a matrix in $\mathbb{Z}_q^{n_i \times i}$ is obtained from a shared matrix having columns related to a member $\{P_i\}_{i \in 1}$.

When a partial solution $\lambda_0$ of $\mathcal{L} = \{X \in \mathbb{Z}^m | \lambda \cdot U_I = 0 \pmod{q}\}$ and $\lambda \cdot U_I = (1, 0, \ldots, 0)$ is fixed, the above-described equation is also satisfied for $\lambda \in \mathcal{L}$ $\lambda_0 - \lambda$.

Therefore, if dim $\mathcal{L} = n_i$, $\mathcal{L} = q^t$, $\pi^i$ is expressed by Equation 11 below.

$$\|\lambda := \lambda_0 - \lambda'\|_2 \leq \frac{\sqrt{n_t}}{2} \cdot \sqrt{n_t} \cdot q^{i/n_t} = \frac{n_t}{2} \cdot q^{1 - \frac{\Delta n_t - 1}{n_t}} \qquad \text{[Equation 11]}$$

Here, it is assumed that the shared matrix U is selected from a uniform distribution to use Gaussian heuristics. For example, an LLL algorithm may be used to find λ. For a sufficiently small t, Minkowshki's bound may be used to estimate a bound. Meanwhile, if t is large, an LLL bound should be used. Hereinafter, how to make $(\Delta n_t-1)/n_t$ large using some methods will be described.

Basically, considering a simple case of $|S_t|=w=O(t)$ when $n_t=wt$ and $\Delta n_t=w$, $n_t$ and $\Delta n_t$ are $O(t)$ and $O(1)$, respectively.

Meanwhile, because $[e^*+\Sigma_{i\in}\lambda_i e_i]_q$ is small in Equation 10 and $\|[e^*+\Sigma_{i\in}\lambda_i e_i]_q\| \leq \|e^*\|+\|\lambda\|\|e\|$, the condition of Equation 12 below should be satisfied for accuracy of cryptography when the contents of the disclosure is applied to a $\{-B, B\}$- LSSS scheme.

$$B_c + B \cdot B_{sm} < q/4 \quad \text{[Equation 12]}$$

Here, $B_c$ and $B_{sm}$ are upper error limits for valid cipher text and partial decipher text, respectively.

If two upper limits are assumed to be fixed, this condition provides a bound of a modulus magnitude q for a given t.

Because $B_c$ is much smaller than q and the inequality $$\left(B \geq \frac{n_t}{2} \cdot q^{1-\frac{\Delta n_t - 1}{n_t}}\right),$$

an anymptotic bound of t may be analyzed as follows.

$$\frac{n_t}{2} \cdot q^{1-\frac{\Delta n_t-1}{n_t}} \cdot B_{sm} < q/4 \Leftrightarrow 2n_t \cdot B_{sm} < q^{\frac{\Delta n_t-1}{n_t}} \quad \text{[Equation 13]}$$

$$\Leftrightarrow (2n_t \cdot B_{sm})^{\frac{n_t}{\Delta n_t-1}} < q$$

In the disclosure, $$(2n_t \cdot B_{sm})^{\frac{n_t}{\Delta n_t-1}}$$

is $O(t^{(1+\delta)t})$ with small $\delta$. Similarly, the LLL bound is $O(2^{t^2})$.

In consideration of the foregoing, in the disclosure, a plurality of partial secret keys may be distributed to each device.

When a secret key is generated, the processor 450 may generate a plurality of partial secret keys using the generated secret key s and a random matrix. For example, the processor 450 may generate a plurality of random values $S_2$, $S_3$, ...

$$s_{n_{t-1}+1},$$

define vector ($\vec{s}=(s, s_2, \ldots, s_{n_{t-1}}+1)^T$ using the secret key s and the random values $s_2, s_3, \ldots,$ $$s_{n_{t-1}+1},$$

and generate a plurality of partial secret keys $\vec{t}$ by reflecting the defined vector on a following random matrix.

$$A = \begin{bmatrix} a_{1,1} & a_{1,2} & a_{1,n_{t-1}} & a_{1,n_{t-1}+1} \\ & & \cdots & \\ a_{2,1} & a_{2,2} & a_{2,n_{t-1}} & a_{2,n_{t-1}+1} \\ \vdots & & \ddots & \vdots \\ \square & \square & \square & \square \\ & & \cdots & \\ a_{n_N,1} & a_{n_N,2} & a_{n_N,n_{t-1}} & a_{n_N n_{t-1}+1} \end{bmatrix} \quad \text{[Equation 14]}$$

Here, A is a random matrix and $n_i$ is the number of secret keys gathered when i people gather.

Meanwhile, such a random matrix may have the number of rows corresponding to the number of users and the number of columns corresponding to the threshold, and in particular, the rows may have a value of a product of the number of users and the number of secret keys to be distributed to each user.

Meanwhile, in the disclosure, it is possible to decrypt a secret key in the case of having a threshold, and here, the secret key cannot be recovered when t-1 people gather and can be recovered only when t or more people gather. If a matrix when t people gather to obtain the linear combination coefficient is $A_t$, the matrix $A_t$ may be expressed by Equation 15 below.

$$A_t = \begin{bmatrix} a_{1,1} & a_{1,2} & a_{1,n_{t-1}} & a_{1,n_{t-1}+1} \\ & & \cdots & \\ a_{2,1} & a_{2,2} & a_{2,n_{t-1}} & a_{2,n_{t-1}+1} \\ \vdots & & \ddots & \vdots \\ \square & \square & \square & \square \\ & & \cdots & \\ a_{n_N,1} & a_{n_N,2} & a_{n_N,n_{t-1}} & a_{n_N n_{t-1}+1} \end{bmatrix} \quad \text{[Equation 15]}$$

As described above, because the disclosure uses the random matrix, Gaussian heuristics $\lambda_1 \approx \lambda_2 \approx \ldots \approx \lambda_{nt}$ in which sizes of the successive minima of the lattice are all similar may be established in an orthogonal matrix $A_t^\perp$ for $A_t$ described above.

Therefore, an upper bound of the magnitude of $\{\lambda i\}$ may be given through the Lattice reduction algorithm or Minkowski's Bound, and the upper bound of the magnitude of the linear combination coefficient $\{vi\}$ may be calculated by applying the upper bound to Babai's algorithm.

Meanwhile, in case of making a difference by distributing w secret keys per person when implemented, the random matrix may have Nw rows and $(t-1)w+1$ columns. Alternatively, in case of making a difference by distributing a secret key to each set including k people among N people, the random matrix may have $$\binom{N}{k}$$

rows and $$\binom{t-1}{k}+1$$

columns.

In case of distributing the partial secret keys in this manner, because the values of $n_t$ and $n_{t-1}+1$ are different, the linear combination coefficient $\{v_i\}$ is not uniquely determined. Therefore, Babai's nearest plane algorithm may be used to find the upper bound of the magnitude of the linear combination coefficient $\{v_i\}$.

Meanwhile, the existing threshold design is defined such that a secret key cannot be recovered when t−1 or less gather and recovered when t or more gather. According to the disclosure, a weaker definition may also be applied for efficiency. That is, in case that a secret key is distributed such that the secret key cannot be recovered if t-c or less, other than t, gather for a certain constant c and can be recovered if t or more gather, then the matrix $A_t$ becomes a $n_t \times \{n_{t-c}+1\}$ matrix and a difference between rows and columns is larger, making the linear combination coefficient $\{v_i\}$ smaller.

In addition, the processor 450 may control the communication device 410 to transmit the generated partial secret key to other devices. Here, the processor 450 may control the communication device 410 to transmit a plurality of partial secret keys to each device.

When the public key is generated, the processor 450 may control the communication device 410 to transmit the public key to other devices.

The processor 450 may generate a homomorphic cipher text for a message. For example, the processor 450 may generate the homomorphic cipher text by applying the previously generated public key to the message. Here, the processor 450 may generate the cipher text to have a length corresponding to a size of a scaling factor.

When the homomorphic cipher text is generated, the processor 450 may control the communication device 410 to store the generated cipher text in the memory 420 or transmit the cipher text to another device according to a user request or a predetermined default command.

Meanwhile, according to an embodiment of the disclosure, packing may be performed. The use of packing in homomorphic encryption makes it possible to encrypt multiple messages in a single cipher text. In this case, when an arithmetic operation is performed between the cipher texts in the arithmetic operation device 400, an arithmetic operation burden is significantly reduced because the arithmetic operation is performed on a plurality of messages in parallel.

Specifically, when a message includes a plurality of message vectors, the processor 450 may convert the plurality of message vectors into a polynomial that may be encrypted in parallel, and then multiply the polynomial by a scaling factor, and perform homomorphic encryption thereon using a public key. Accordingly, a cipher text packing a plurality of message vectors may be generated.

When the homomorphic cipher text is required to be decrypted, the processor 450 may generate a polynomial decipher text by applying a secret key to the homomorphic cipher text and generate a message by decoding the polynomial decipher text. Here, the generated message may include an error as mentioned in Equation 1 described above.

Meanwhile, in case of having the partial secret key, the processor 450 may control the communication device 410 to generate a partial decipher text using the partial secret key for the homomorphic cipher text and transmit the generated partial decipher text to another device, or may decrypt the message for the cipher text by collecting a predetermined number (i.e., threshold) of partial decipher texts or more provided from other devices.

In addition, when the processor 450 has the partial secret key, the processor 450 may collect the partial secret keys equal to or greater than the threshold from other devices and generate a secret key using the collected partial secret keys. In addition, the processor 450 may decrypt the message using the generated secret key.

The processor 450 may perform an arithmetic operation on the cipher text. Specifically, the processor 450 may perform an arithmetic operation such as addition, subtraction, or multiplication, while maintaining the encrypted state regarding the homomorphic cipher text.

When the arithmetic operation is completed, the arithmetic operation device 400 may detect data of a valid area from arithmetic operation result data. Specifically, the arithmetic operation device 400 may perform a rounding process on the arithmetic operation result data to detect data of a valid area. The rounding process refers to round-off of a message in an encrypted state. Alternatively, the rounding process may also be referred to as rescaling.

In addition, when a portion of an approximation message in the arithmetic operation result cipher text exceeds a threshold, the arithmetic operation device 400 may perform a rebooting operation on the cipher text.

As described above, the arithmetic operation device 400 according to the present embodiment generates the partial secret keys that satisfy the threshold using the random matrix, thereby further reducing the size of the linear combination coefficient required for recovering the secret key. Further, because the arithmetic operation device 400 distributes a plurality of partial secret keys to each user, which is advantageous when N is very large compared to t.

Hereinafter, a trade-off method according to threshold design will be described.

First, it is assumed that there is a (t, N)-threshold design that distributes c partial secret keys to each person. According to this, 2N people may be divided into two groups $P_0$ and $Q_0$ to create a (2t, 2N)-threshold design.

Also, $P_N = Q_0$, $Q_N = P_0$ may be easily checked when $P_i = \{b_1, \ldots, b_i, a_{i+1}, \ldots, a_N\}$, $Q_i = \{a_1, \ldots, a_i, b_{i+1}, \ldots, b_N\}$ is defined.

Here, the secret key s may be divided by $s = x_i + y_i$ and (t, N)-threshold design having secret keys as $x_i$, $y_i$ to $\{P_i, Q_i\}$.

If 2t−1 people or less gather, any $\{P_i, Q_i\}$ pair cannot recover all the secret keys $x_i$, $y_i$ so the secret key s cannot be recovered. If people or more gather, at least one of N people N $\{P_i, Q_i\}$ may recover the secret key $x_i$, $y_i$, so the secret key s may be recovered.

Thus, if a (t, N)-threshold design for distributing c secret keys to each person exists, a (2t, 2N)-threshold design for distributing cN secret keys to each person may also be created.

Figure 3:
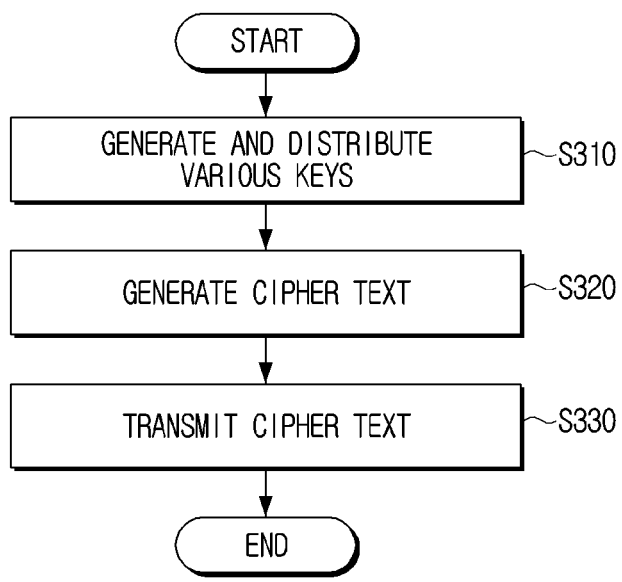
FIG. 3 is a flowchart illustrating an example of a method of generating a cipher text of the disclosure.

FIG. 3 is a flowchart illustrating an example of a method of generating a cipher text of the disclosure.

Referring to FIG. 3, a secret key and a public key may be generated (S310). Specifically, a ring may be set, a secret key may be generated through the set ring, and a public key may be generated using the generated secret key. Here, for threshold design, a plurality of partial secret keys may be generated using the secret key. A specific operation of generating the partial secret keys will be described later with reference to FIG. 4.

Thereafter, the cipher text may be generated using the generated public key (S320). For example, a homomorphic cipher text may be generated by applying a public key to a message.

The generated cipher text may be transmitted (S330). The generated homomorphic cipher text may be stored or transmitted to another device.

Figure 4:
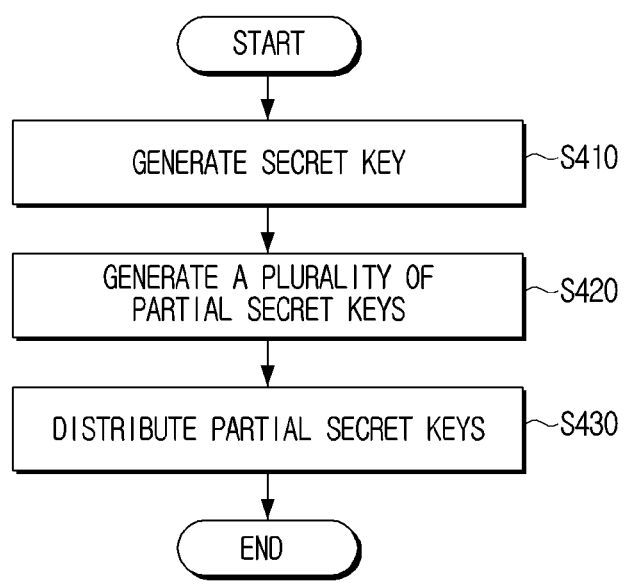
FIG. 4 is a flowchart illustrating an example of a method of generating a partial secret key of the disclosure.

FIG. 4 is a flowchart illustrating an example of a method of generating a partial secret key of the disclosure.

Referring to FIG. 4, a secret key may be calculated (S410). Specifically, addition and multiplication are defined between elements, and a secret key may be calculated from a ring which is a set closed for addition and multiplication.

A plurality of partial secret keys may be generated using the calculated secret key and a random matrix (S420). Specifically, a plurality of random values may be generated and a plurality of partial secret keys may be generated by applying vector matrix including the plurality of random values and the secret key to a random matrix. Here, the random matrix may have the number of rows corresponding to the number of users and the number of columns corresponding to the threshold. The random matrix may have the number of users and the number of rows corresponding to the number of secret keys to be distributed to each user so that a plurality of secret keys may be distributed to each user.

The plurality of generated partial secret keys may be distributed (S430). Specifically, in case of distributing the plurality of secret keys to each user, the plurality of generated partial secret keys may be distributed to each user.

Figure 5:
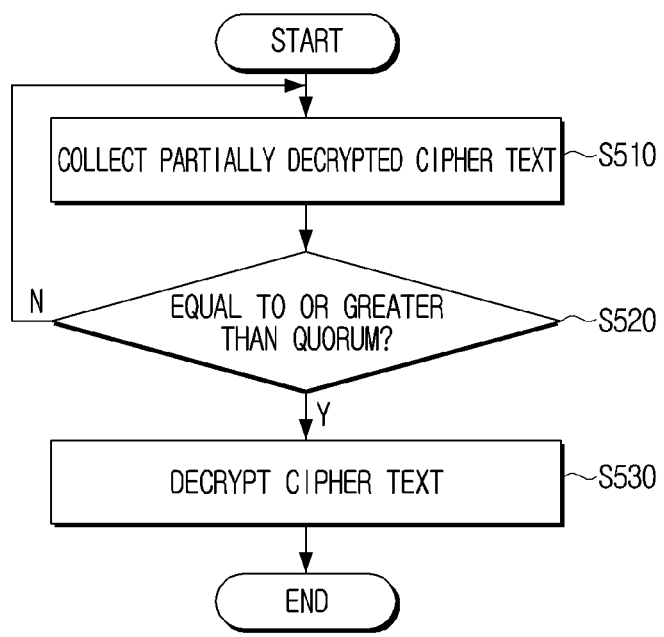
FIG. 5 is a flowchart illustrating a method of decrypting a cipher text using a plurality of partial secret keys.

FIG. 5 is a flowchart illustrating a method of decrypting a cipher text using a plurality of partial secret keys.

Referring to FIG. 5, first, partial decipher texts equal to or greater than a threshold for the cipher text using a partial secret key is collected (S510). Specifically, as described above, message may be decrypted when the secret keys equal to or greater than the threshold are collected, and thus, an arithmetic operation device may collect the partial secret keys equal to or greater than the threshold or the partial decipher texts equal to or greater than the threshold.

If the partial decipher texts equal to or greater than the threshold are not collected (S520-N), the collecting operation described above may be repeated, and if the partial decipher texts equal to or greater than the threshold are not collected within a predetermined time, the decrypting operation may be terminated or an error may be notified.

If the partial decipher texts equal to or greater than the threshold are collected (S520-Y), the collected partial decipher texts may be linearly combined to decrypt the message (S530).

Meanwhile, although decrypting the message using the partial decipher texts equal to or greater than the threshold is described, in case of implementation, after the partial secret keys equal to or greater than the threshold are collected, a secret key may be generated using the collected partial secret keys, and a homomorphic cipher text may be decrypted using the generated secret key.

Meanwhile, the method of processing a cipher text according to various embodiments described above may be implemented in the form of a program code for performing each step and may be stored in a recording medium and distributed. In this case, a device in which the recording medium is mounted may perform the operations such as encryption, cipher text processing, or the like described above.

The recording medium may be various types of computer-readable mediums such as ROM, RAM, memory chip, memory card, external hard disk, hard disk, CD, DVD, magnetic disk, or magnetic tape.

While the disclosure has been described with reference to the accompanying drawings, it is to be understood that the scope of the disclosure is defined by the claims described hereinafter and should not be construed as being limited to the above-described embodiments and/or drawings. It is to be clearly understood that improvements, changes, and modifications that are obvious to those skilled in the art are also within the scope of the disclosure as defined in the claims.

What is claimed is:

1. An encryption method comprising:
    calculating a secret key from a ring as a set closed for addition and multiplication defined between elements;
    generating a plurality of partial secret keys using the calculated secret key and a random matrix;
    generating a public key using the secret key;
    generating a homomorphic ciphertext using the generated public key, the homomorphic ciphertext can be operated and calculated without decryption;
    distributing the plurality of generated partial secret keys and the homomorphic ciphertext;
    collecting partial decipher texts each generated by applying the homomorphic ciphertext to a partial secret key among the plurality of partial secret keys equal to or greater than a threshold; and
    decrypting a plain text corresponding to the homomorphic ciphertext using the collected partial decipher texts equal to or greater than the threshold.

2. The encryption method as claimed in claim 1, wherein the random matrix has a number of rows corresponding to a number of users and a number of columns corresponding to a threshold.

3. The encryption method as claimed in claim 1, wherein the random matrix has a number of rows corresponding to a number of users and a number of keys to be distributed to each user and a number of columns corresponding to a threshold.

4. The encryption method as claimed in claim 3, wherein in the distributing, the plurality of distribution secret keys is distributed to each user by the number of keys.

5. The encryption method as claimed in claim 1, wherein in the generating, a plurality of random values is generated and the plurality of partial secret keys are generated by applying a vector matrix including the plurality of random values and the secret key to the random matrix.

6. The encryption method as claimed in claim 1, further comprising:
    collecting partial secret keys equal to or greater than a threshold, among the plurality of partial secret keys; and
    recovering the secret key using the collected partial secret keys.

7. An arithmetic operation device comprising:
    a memory configured to store at least one instruction; and
    a processor configured to execute the at least one instruction,
    wherein the processor, by executing the at least one instruction, calculates a secret key from a ring as a set closed for addition and multiplication defined between elements, generates a plurality of partial secret keys using the calculated secret key and a random matrix, generates a public key using the secret key, generates a homomorphic ciphertext using the generated public key, the homomorphic ciphertext can be operated and calculated without decryption, distributes the plurality of generated partial secret keys and the homomorphic ciphertext, collects partial decipher texts each generated by applying the homomorphic ciphertext to a partial secret key among the plurality of partial secret keys equal to or greater than a threshold and decrypts a plain text corresponding to the homomorphic ciphertext using the collected partial decipher texts equal to or greater than the threshold.

8. The arithmetic operation device as claimed in claim 7, wherein
the processor generates a plurality of random values and generate the plurality of partial secret keys by applying a vector matrix including the plurality of random values and the secret key to the random matrix.

9. The arithmetic operation device as claimed in claim 7, wherein
the random matrix has a number of rows corresponding to a number of users and a number of secret keys to be distributed for each user and a number of columns corresponding to a threshold, and the processor is configured to distribute the plurality of partial secret keys to each user.

* * * * *

UNITED STATES PATENT AND TRADEMARK OFFICE
CERTIFICATE OF CORRECTION

PATENT NO. : 11,201,735 B2
APPLICATION NO. : 16/791297
DATED : December 14, 2021
INVENTOR(S) : Jung Hee Cheon et al.

It is certified that error appears in the above-identified patent and that said Letters Patent is hereby corrected as shown below:

On the Title Page

Under (73) Assignee, insert --Crypto Lab Inc.--

Signed and Sealed this
Fourth Day of October, 2022

*Katherine Kelly Vidal*

Katherine Kelly Vidal
*Director of the United States Patent and Trademark Office*